R. R. FENNER.

Improvement in Plows.

No. 130,797. Patented Aug. 27, 1872.

Witnesses.
A. Ruppert.
P. Cells J. Gils

Inventor.
R. R. Fenner
Edson Brothers
Attorneys

UNITED STATES PATENT OFFICE.

ROBERT R. FENNER, OF URBANA, ILLINOIS.

IMPROVEMENT IN PLOWS.

Specification forming part of Letters Patent No. 130,797, dated August 27, 1872; antedated August 24, 1872.

*To all whom it may concern:*

Be it known that I, ROBERT R. FENNER, of Urbana, in the county of Champaign and State of Illinois, have invented a certain new and useful Improvement in Plows; and I do hereby declare the following to be a full, clear, and exact description thereof, reference being had to the accompanying drawing forming a part of the same, and in which—

Figure 1:
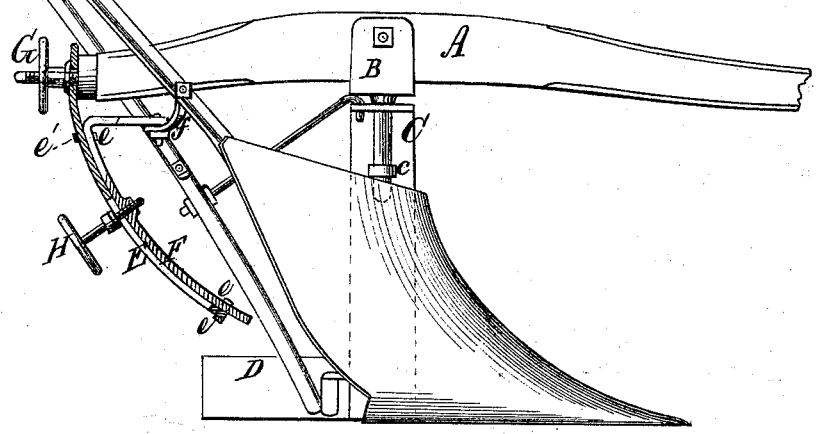
Figure 2:
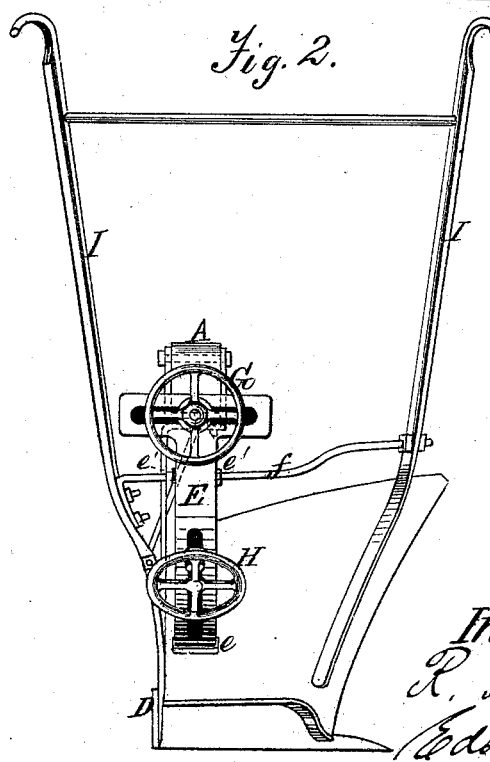

Figure 1 represents a side view of my plow with the guide and guide-plate taken in section, and Fig. 2 is a rear elevation thereof.

Like letters of reference in both of the figures refer to like parts.

This invention, which is an improvement upon my improved stubble and subsoil plow for which Letters Patent were granted the 22d day of June, 1869, and numbered 91,617, consists in the combination hereinafter more fully set forth and claimed.

To enable others to make and use my invention I will proceed to describe it.

In the accompanying drawing, A refers to the plow-beam, which is embraced by a metallic clevis or clip, B, within which it is pivoted, by means of a bolt, in such a manner as to permit of its having vertical movement, for the purpose of allowing of the plow being regulated in reference to the depth it is desired it should go in entering the ground. This clevis is constructed or supplied with a stem which passes down through an aperture in a bracket or standard, C, having its upper end bent at a right angle to its vertical portion, and an eye or loop, $c$, fastened to the said standard or bracket C, as plainly shown in Fig. 1. The standard or bracket C is firmly fastened with any suitable means at its lower end to the inner portion of the land-side D of the plow. By so securing the plow-beam it can be swung around to a certain extent or be susceptible of lateral movement, whereby, as will be more fully ascertained from the practical working of the plow, a narrower or broader furrow or channel in the ground can be made. E refers to the T-shaped guide, which is fastened in place and constructed the same as in my patent herein mentioned, with the exception that that portion thereof made straight in the patent, which is its vertical portion, is of a curvilinear shape in my improvement, the object of which is to permit of its conforming more readily and easily to the movement of the plow-beam when thrown up or down or moved vertically. The lower end of this guide is supplied with flanges $e\ e$, which embrace the guide-plate hereinafter described, and are for the purpose of retaining that end of the said guide in place while being operated, the upper end of the same being held in place or in contact with the said guide-plate by similar flanges or guides $e'\ e'$ fastened to the upper end of the latter. F refers to the guide-plate above alluded to, in contact with which the guide E is brought, it being made of such a shape as to correspond with that of the guide E, and is for the purpose of affording a guide and support for the lower portion of said guide E. The guide-plate F is secured in place at the inner end of its horizontal portion to the brace $f$, connecting the handles I I of the plow together. The said guide E is adjusted or operated, in reference to the beam A and the guide-plate F, by means of screw-bolts and the hand-wheels G and H, which are the same as the means employed in my patent for this purpose.

Having thus described my invention, what I claim, and desire to secure by Letters Patent, is—

As an improvement upon my former patent granted the 22d of June, 1869, I claim the curved T-shaped guide E, in combination with the curved guide-plate F, constructed and arranged to operate substantially as shown and described.

In testimony whereof I have hereunto signed my name this 18th day of October, A. D. 1871, in presence of two subscribing witnesses.

R. R. FENNER.

Witnesses:
   M. LINDLY,
   A. J. SCHILING.